(12) United States Patent
Northrup, Jr.

(10) Patent No.: US 7,347,918 B2
(45) Date of Patent: Mar. 25, 2008

(54) ENERGY EFFICIENT EVAPORATION SYSTEM

(76) Inventor: Lynn L. Northrup, Jr., 1905 Marilla St., Dallas, TX (US) 75201

( * ) Notice: Subject to any disclaimer, the term of this patent is extended or adjusted under 35 U.S.C. 154(b) by 0 days.

(21) Appl. No.: 11/432,595

(22) Filed: May 11, 2006

(65) Prior Publication Data

US 2006/0196760 A1    Sep. 7, 2006

Related U.S. Application Data

(63) Continuation of application No. 10/604,073, filed on Jun. 25, 2003, now abandoned.

(60) Provisional application No. 60/392,294, filed on Jun. 27, 2002.

(51) Int. Cl.
*B01D 3/42*    (2006.01)

(52) U.S. Cl. ............... 203/1; 203/2; 203/3; 203/22; 203/25; 203/27; 203/49; 203/90

(58) Field of Classification Search ............ 203/1–3, 203/22, 25, 27, 49, 90, 100
See application file for complete search history.

(56) References Cited

U.S. PATENT DOCUMENTS

| | | | |
|---|---|---|---|
| 2,009,372 A | 7/1935 | Moore | |
| 2,576,663 A | 11/1951 | Atchison | |
| 3,692,048 A * | 9/1972 | Uchida et al. | ............ 137/403 |
| 3,693,370 A | 9/1972 | Miller | |
| 4,267,022 A | 5/1981 | Pitcher | |
| 4,278,502 A | 7/1981 | Stevens et al. | |
| 4,292,121 A * | 9/1981 | Caffes | ............ 159/3 |
| 4,313,311 A | 2/1982 | McCord | |
| 4,536,257 A * | 8/1985 | Atwell | ............ 202/177 |
| 4,551,796 A * | 11/1985 | Singh | ............ 700/28 |
| 4,686,009 A | 8/1987 | McCabe | |
| 4,770,748 A | 9/1988 | Cellini et al. | |
| 4,880,504 A | 11/1989 | Cellini et al. | |
| 5,439,560 A | 8/1995 | Kurematsu et al. | |
| 5,630,913 A | 5/1997 | Tajer-Ardebili | |
| 5,695,614 A | 12/1997 | Hording et al. | |
| 5,980,698 A | 11/1999 | Abrosimov et al. | |
| 6,267,848 B1 | 7/2001 | Popov | |
| 6,303,006 B1 | 10/2001 | Chang et al. | |
| 6,350,351 B1 | 2/2002 | Popov et al. | |
| 6,355,145 B1 | 3/2002 | Kresnyak et al. | |
| 6,436,242 B1 | 8/2002 | Sanchez Belmar | |

(Continued)

*Primary Examiner*—Virgina Manoharan
(74) *Attorney, Agent, or Firm*—Mark W. Handley

(57) ABSTRACT

An evaporation system uses the weight of condensed liquid as an energy source. An inlet feed is introduced into an enclosure through an inlet. The inlet feed is vaporized in an evaporation region of the enclosure, and condensed to a liquid in a condensation region of the enclosure. The condensed liquid collects in a liquid region of the enclosure. The liquid region has an outlet. A blower between the evaporation region and the condensation region maintains the condensation region at a higher pressure than the evaporation region. The level of the liquid in the liquid region defines the volume and pressure of the evaporation and condensation regions, such that as the liquid is drained from the outlet, at least in part by the weight of the liquid, the pressure in the evaporation region decreases. The flow through the inlet and the outlet is regulated to maintain the pressure in the evaporation region at a pressure that tends to vaporize the inlet feed.

17 Claims, 3 Drawing Sheets

U.S. PATENT DOCUMENTS

| | | |
|---|---|---|
| 6,508,916 B1 | 1/2003 | Razzaghi et al. |
| 6,508,936 B1 | 1/2003 | Hassan |
| 6,551,466 B1 | 4/2003 | Kresnyak et al. |
| 6,840,744 B2 * | 1/2005 | Watling ................. 417/249 |

* cited by examiner

ENERGY EFFICIENT EVAPORATION SYSTEM

CROSS-REFERENCE TO RELATED APPLICATION

The present application is a continuation of and claims benefit under Title 35, U.S. Code, Section 120 of U.S. patent application Ser. No. 10/604,073, filed Jun. 25, 2003, now abandoned, which claims the benefit under Title 35, U.S. Code, Section 119(e) of U.S. Provisional Patent Application Ser. No. 60/392,294, filed Jun. 27, 2002, expired.

TECHNICAL FIELD OF THE INVENTION

The present invention relates generally to evaporation systems, and more particularly to an evaporation system and method using a weight of condensed liquid as an energy source.

BACKGROUND OF THE INVENTION

Many systems today incorporate the function of evaporating a materials as part of a process. As with many systems, the benefits provided by the operation of these systems is often limited or sometimes even outweighed by their prohibitive operation costs due to both equipment costs and energy consumption costs. A prime example of such a limited process is a conventional desalinization system.

One common method for desalinating brine water is distillation. In this process, heat is added to the system where the brine water is introduced until the water vaporizes and leaves behind the brine. The vapor is condensed and the resulting condensation is salt free water. Vaporizing the water consumes large amounts of energy. Many systems utilize compressors, vacuum pumps, heat transfer systems, and heat source devices in efforts to control system pressures and temperatures needed for evaporation to occur. Each of those types of working devices requires either electrical, mechanical, chemical or other energy input to operate. While sources of that energy are numerous, the costs related to reaching proper levels of temperature and pressure have traditionally been great. Other systems that use evaporative processes, for example evaporative cooling systems, suffer similar problems.

Therefore there is a need for a method and apparatus which performs evaporative processes in a more energy efficient manner. For example, there is a well recognized need for a method and apparatus which desalinates brine water into highly pure water in a more energy efficient manner.

SUMMARY OF THE INVENTION

An evaporation system is disclosed which uses the weight of condensed liquid as an energy source. An inlet feed is introduced into an enclosure through an inlet. The inlet feed is vaporized in an evaporation region of an enclosure, and condensed to a liquid in a condensation region of the enclosure. The condensed liquid collects in a liquid region of the enclosure. The liquid region has an outlet. A blower between the evaporation region and the condensation region maintains the condensation region at a higher pressure than the evaporation region. The level of the liquid in the liquid region defines the volume and pressure of the evaporation and condensation regions, such that as the liquid is drained from the outlet, at least in part by the weight of the liquid, the pressure in the evaporation region decreases. The flow through the inlet and the outlet is regulated to maintain the pressure in the evaporation region at a pressure that tends to vaporize the inlet feed.

DESCRIPTION OF THE DRAWINGS

Various objects and advantages of the invention will become apparent and more readily appreciated from the following description of the exemplary embodiments, taken in conjunction with the accompanying drawings of which.

DETAILED DESCRIPTION OF THE INVENTION

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
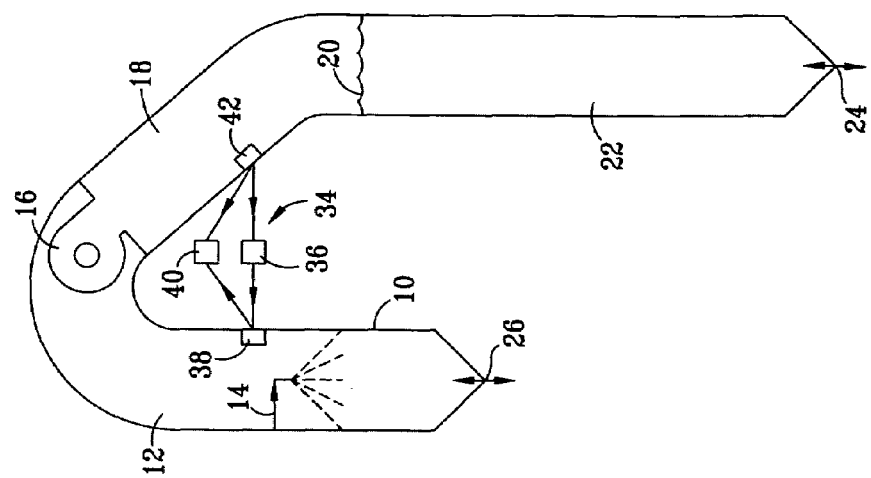
FIG. 1 is a schematic of an exemplary evaporation system constructed in accordance with this invention.

Now referring to the diagrammatic representation in FIG. 1, an embodiment of a desalinization apparatus constructed in accordance with the principles of the present invention is set forth. The enclosure is generally a hollow inverted U-shaped enclosure 10 having a first downward extending leg 10a, a second downward extending leg 10b, and a curved region 10c. Except where later specified, enclosure 10 is a closed system capable of withstanding forces caused by variations of pressure both within the enclosure and between its internal pressure and the pressure outside the enclosure. As will be discussed in more detail below, variations in pressures within the enclosure enable the apparatus to induce phase changes of materials placed within the enclosure, in this example, brine water. While this enclosure 10 shown in FIG. 1 is generally an inverted U-shape, it could be shaped in any other manner consistent with the purpose of the apparatus. For example, the enclosure could be a straight hollow vertical enclosure. The enclosure could also be a generally straight length oriented horizontally which after some length first bends into a downwardly sloped orientation. After some additional length a second bend occurs where the enclosure has a vertical or near vertical region. Downward sloped and vertical oriented regions naturally pool condensate as well as utilize the weight of the water to reduce pressure in the enclosure 10 as will be further explained below. Consequently, the U-shaped enclosure 10 is an exemplary enclosure consistent with the principles of the function of the apparatus and is discussed as only one of any number of other structural variations that could equally accomplish the desalinization process.

An inlet 14 capable of introducing liquid into the system is located in the first downwardly extending leg 10a of the inverted U-shaped enclosure 10. The liquid is introduced into this exemplary enclosure as a fine mist of brine water converted to such form by means of a nozzle or equivalent technology. The brine water is preferably in mist form to expose maximum surface area of the material in an effort to aid in the quick vaporization of those liquid droplets. In the curved region 10c of the inverted U-shaped enclosure 10, a blower 16 is oriented such that the input side of the blower faces the first leg 10a and the output side of the blower 16 the second leg 10b. The blower 16 defines a lower pressure evaporation region 12 in the space within the enclosure 10 on the input side of the blower 16, and a higher pressure condensation region 18 on the output side of the blower 16. However, the blower 16 does not serve as a seal between the evaporation region 12 and the condensation region 18. The condensation region 18 encompasses the space within the inverted U-shaped enclosure 10 between the output side of the blower 16 and the liquid level boundary 20. The liquid level boundary 20 denotes the interface of the condensation region 18 and the liquid region 22. The liquid region 22 consists of a variable volume of liquid which is located in the second leg 10b of the inverted U-shaped enclosure 10. Additionally, there are two system ports which control mass flow through the use of valves or the like. A byproduct port 26 is located in the first leg 10a below the inlet 14. A liquid port 24 is located in the second leg 10b near the bottom of the liquid region 22. These valve controlled ports 26 and 24 may serve as mass inputs or outputs to the system.

In operation, the pressures of the evaporation region 12 and the condensation region 18 are regulated by two major functions of the apparatus. First, it must be noted that the mass of liquid in the liquid region 22 acts as a piston within the inverted U-shaped enclosure 10 insofar as the location of the liquid level boundary 20 affects volume and thus the pressure within the system. With the liquid port 24 open, the weight of the liquid in the liquid region 22 tends to lower the liquid level boundary 20 as liquid flows out of the system through the liquid port 24. The change in location of the liquid level boundary 20 tends to increase the combined volume of the evaporation region 12 and condensation region 18. The increase in volume tends to decrease the pressure within both the evaporation region 12 and the condensation region 18. The total weight of the liquid in the liquid region 22 is regulated by the addition or removal of liquid to that region. Addition or removal of liquid is performed such that a predetermined pressure is obtained within the evaporation region 12 and condensation region 18. The predetermined pressure can be a value where at such pressure the liquid introduced through the inlet 14 would tend to vaporize. The desired pressure value is dependent upon the chemical makeup of the liquid introduced to the system through the inlet 14, the desired rate of vaporization, and the temperature of the system. Furthermore, the total weight of the liquid may be increased beyond the weight necessary to achieve a pressure within the evaporation region 12 which would tend to vaporize the liquid introduced through the inlet 14. The increased weight of the liquid would tend to force liquid out of the liquid region 22 through the liquid port 24.

Additionally, operation of the blower 16 affects the pressure within the evaporation region 12 and the condensation region 18. Operation of the blower 16 aids the vapor in rising to the upper portion of the evaporation region 12. After the vapor has risen, the blower 16 acquires vapor from the evaporation region 12 and forces that vapor into the condensation region 18. The forced mass transfer from the evaporation region 12 to the condensation region 18 results in a lower pressure in the evaporation region 12 than the resulting pressure of the condensation region 18. The desired pressure difference between the evaporation region 12 and the condensation region 18 is such that the pressure in the evaporation region 12 would tend to vaporize the liquid introduced through the inlet 14 and the pressure in the condensation region 18 would tend to condense the vapor back into liquid form.

Upon introducing the fine liquid mist of brine water into the evaporation region 12 having a pressure that tends to vaporize water, the water content of the brine water mist is vaporized, thereby desalinating the brine water and separating the water from the brine which does not vaporize but remains in the evaporation region 12. Vapor is then removed by the blower 16 from the evaporation region 12 and forced into the condensation region 18. Since the condensation region 18 has a pressure that tends to condense the water vapor, the vapor condenses into liquid form. The water condensate accumulates in the condensation region and the weight of the condensate draws the condensate downward from the condensation region 18 until it joins the liquid region 22 at the liquid level boundary 20. The accumulation would, over time, tend to affect the location of the liquid level boundary 20 resulting in a fluctuation of volume and pressure within the evaporation region 12 and condensation region 18. The fluctuation is regulated or avoided by regulation of mass flow through the liquid port 24, preferably by matching the rate of liquid out of the liquid port 24 to the rate of condensate accumulation, resulting in a stationary liquid level boundary 20. The liquid flowing from the liquid port 24 is desalinated water.

Figure 2:
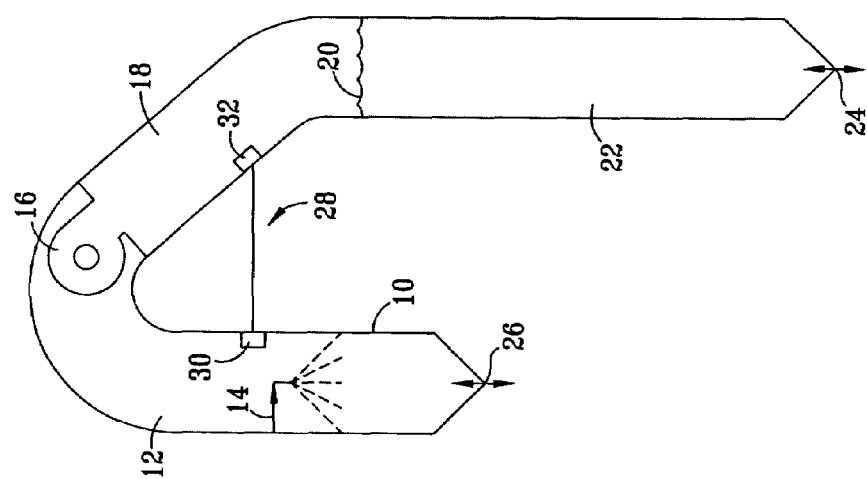
FIG. 2 is a schematic of an another exemplary evaporation system constructed in accordance with this invention.

Now referring to the diagrammatic representation in FIG. 2, a second exemplary apparatus for desalinization of brine water is depicted. This apparatus is similar to the apparatus of FIG. 1 but with the incorporation of a heat transfer system 28. The heat transfer system 28 transfers heat from the condensation region 18 to the evaporation region 12. The transfer occurs through the use of two heat exchangers, an absorbing heat exchanger 32 and a rejecting heat exchanger 28. The absorbing heat exchanger 32 brings heat into the heat transfer system 28 while the rejecting heat exchanger 30 releases heat from the heat transfer system 28. Performance of the heat transfer tends to lower the temperature of the condensation region 18. Lowering the temperature in the condensation region 18 aids in the condensation of the water vapor present in the condensation region 18. Likewise, the transfer of heat to the evaporation region 12 tends to raise the temperature of the evaporation region 12. Raising the temperature in the evaporation region 12 aids in the vaporization of the fine liquid mist of brine water.

Figure 3:
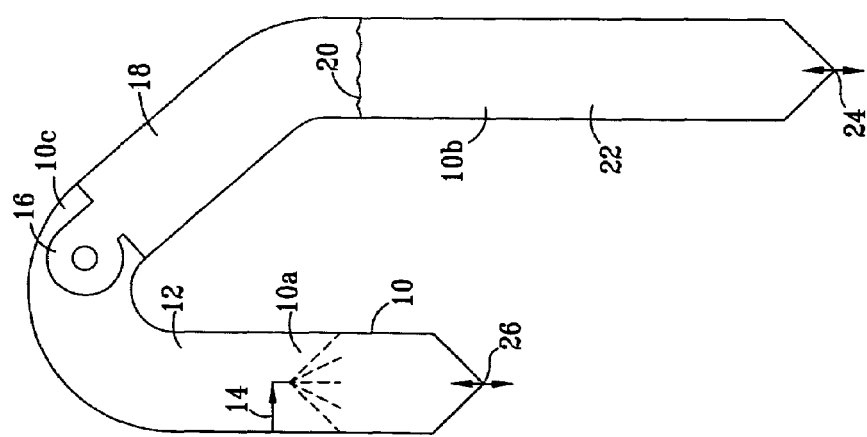
FIG. 3 is a schematic of yet another exemplary evaporation system constructed in accordance with this invention.

FIG. 3 depicts an exemplary heat transfer system based on a Rankine cycle to perform the heat exchange. The Rankine cycle heat transfer system 34 in this exemplary desalinization apparatus implements a refrigeration cycle having a compressor 36 which compresses refrigerant and forces refrigerant flow a condensing heat exchanger 38, an expansion valve 40, and an evaporative heat exchanger 42. The refrigeration cycle discussed herein is exemplary and it is to be understood that other heat transfer systems can be substituted therefore. In this exemplary system, compressed refrigerant flows to the condensing heat exchanger 38. As the compressed refrigerant enters the condensing heat exchanger 38 at a high temperature, heat is transferred to the evaporation region 12. The refrigerant generally leaves the condensing heat exchanger 38 in liquid form. As the refrigerant flows from the condensing heat exchanger 38 and approaches the evaporative heat exchanger 42, it passes through a flow restriction device, in this case an expansion valve 40, which causes the refrigerant to boil within the evaporative heat exchanger 42. Boiling refrigerant reduces the temperature of the evaporative heat exchanger 42 and consequently reduces the temperature of the condensation region 18 by exposing the cold evaporative heat exchanger 42 to the warmer condensation region 18. Exposure to that region raises the temperature of the refrigerant within the evaporative heat exchanger 42. The warmer refrigerant flows from the evaporative heat exchanger 42 to the compressor 36 to be compressed and repeat the cycle. The process effectively transfers heat from the condensation region 18 to the evaporation region 12. Incorporation of the heat transfer system 28 or the Rankine cycle heat transfer system 34 affects the desalinization process because phase changes of water not only depend upon pressure but also temperature. By raising the temperature of the evaporation region 12 and lowering the temperature of the condensation region 18, the pressure difference supplied by the blower 16 can be reduced while still accomplishing the task of desalinization.

Using the above described apparatuses and methods to desalinate water fulfill a timeless need for the improvement of energy efficiency when desalinating water. The use of the weight of water to reduce the pressure within the disclosed apparatus drastically reduces the electrical, chemical, or additional mechanical energy needed to acquire the proper pressures to perform the desalinization process. In short, the apparatus described utilizes the potential energy of the liquid in the liquid region 22 by reducing the pressure in the evaporation region 12 and the condensation region 18. After reduction in pressure, the blower 16 further creates the necessary pressure differential to condense the already vaporized water. While the blower does consume energy during operation, that energy consumption is much less than the conventional methods of desalinating water which usually require vacuum pumps, compressors or heat sources. Using the weight of the liquid in the liquid region 22 to reduce the pressure rather than using the conventional means of reducing pressure provides great economical advantages over those conventional systems. First, the energy consumption is much lower because the potential energy of the water is constantly available and costs nothing once the water is in the liquid region 22. Second, by eliminating the use of compressors, vacuum pumps and heat sources, many maintenance issues and costs are avoided. This avoidance leads to lower operation costs and less chance of ceasing operation to perform repairs.

Even in the second exemplary apparatus which includes a heat transfer system, the total energy consumption of the apparatus remains lower than conventional methods of desalinization. Although some conventional methods do incorporate compressors for achieving specific pressures and temperatures within the systems, they generally are used to perform much more work than the above described heat transfer systems 28 and 34. Since they perform more work the conventional compressors consume more energy. In the disclosed apparatus, the majority of work required to achieve proper temperatures and pressures for desalinization are performed by the weight of the liquid in the liquid region 22. The heat transfer system implemented here would be used to achieve a slight temperature difference between the evaporation region 12 and the condensation region 18. For example, the heat transfer systems 28 and 34 provide great benefits when only operated to transfer heat equal to the latent heat of condensation from the condensation region 18 to the evaporation region 12. Overall, the total energy consumption of the desalinization apparatus, even with the addition of a heat transfer system 28 or 34, is less than that of conventional methods of desalinization.

Additionally, using the weight of a liquid as an energy source for evaporation is not limited only to desalinization. The method and apparatuses above can be modified to distill other mixtures. This is accomplished by adjusting the amount of liquid in the liquid region 22, the amount of work performed by the blower 16, and the amount of work performed by the heat transfer system 28 or 34 (if provided). Those three variables are adjusted to achieve pressures and temperature values within the evaporation region 12 and the condensation region 18 which are appropriate for evaporation and condensation, respectively, of the other mixture. It should also be noted that by varying the temperature of the mixture introduced into the evaporation region 12, the energy consumed by the system in order to vaporize the mixture is changed. For example, by introducing hot liquid into the evaporation region 12, the energy consumed by the system to vaporize that liquid is reduced. Likewise, a cooler liquid introduced into the evaporation region 12 would require more energy to be consumed by the system in order to vaporize the liquid. Raising the temperature of the mixture introduced into the evaporation region 12 also allows for successful operation of the apparatus with higher pressures in the evaporation region 12. Furthermore, the mixture need not be introduced in liquid form. The inlet 14 could be modified to introduce solids into the system in pellet or granular form or otherwise. Under proper conditions, many solids change phases directly from solid to vapor form. Upon sublimation of the solids, the resulting vapor is then condensed into liquid form.

Figure 4:
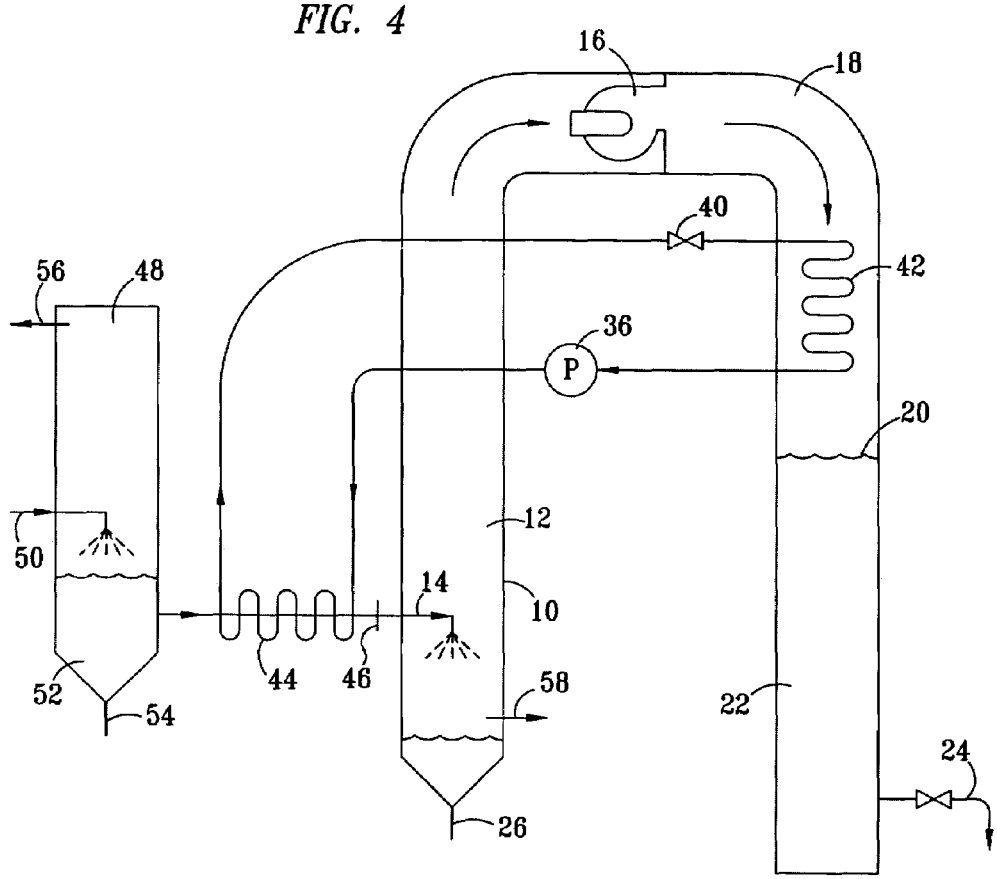
FIG. 4 is a schematic of an exemplary distillation system constructed in accordance with this invention.

Referring now to FIG. 4, the thermal efficiency of the system is enhanced by positioning the condenser 44 in the liquid inlet 14, which raises the temperature of the inlet liquid. A restriction 46 creates a pressure difference in the inlet liquid, thereby facilitating vaporization. In this embodiment, pump 36 is a heat pump compressor. A degasifier 48 has an inlet 50, with inlet 14 feeding from the degasified liquid 52. Drain 54 permits the removal of sediments that form in degasifier 48. Gases are removed from degasifier outlet 56 by way of a vacuum pump (not shown). Similarly, gases are removed from evaporation region 12 at outlet 58 by way of a vacuum pump (not shown).

Figure 5:
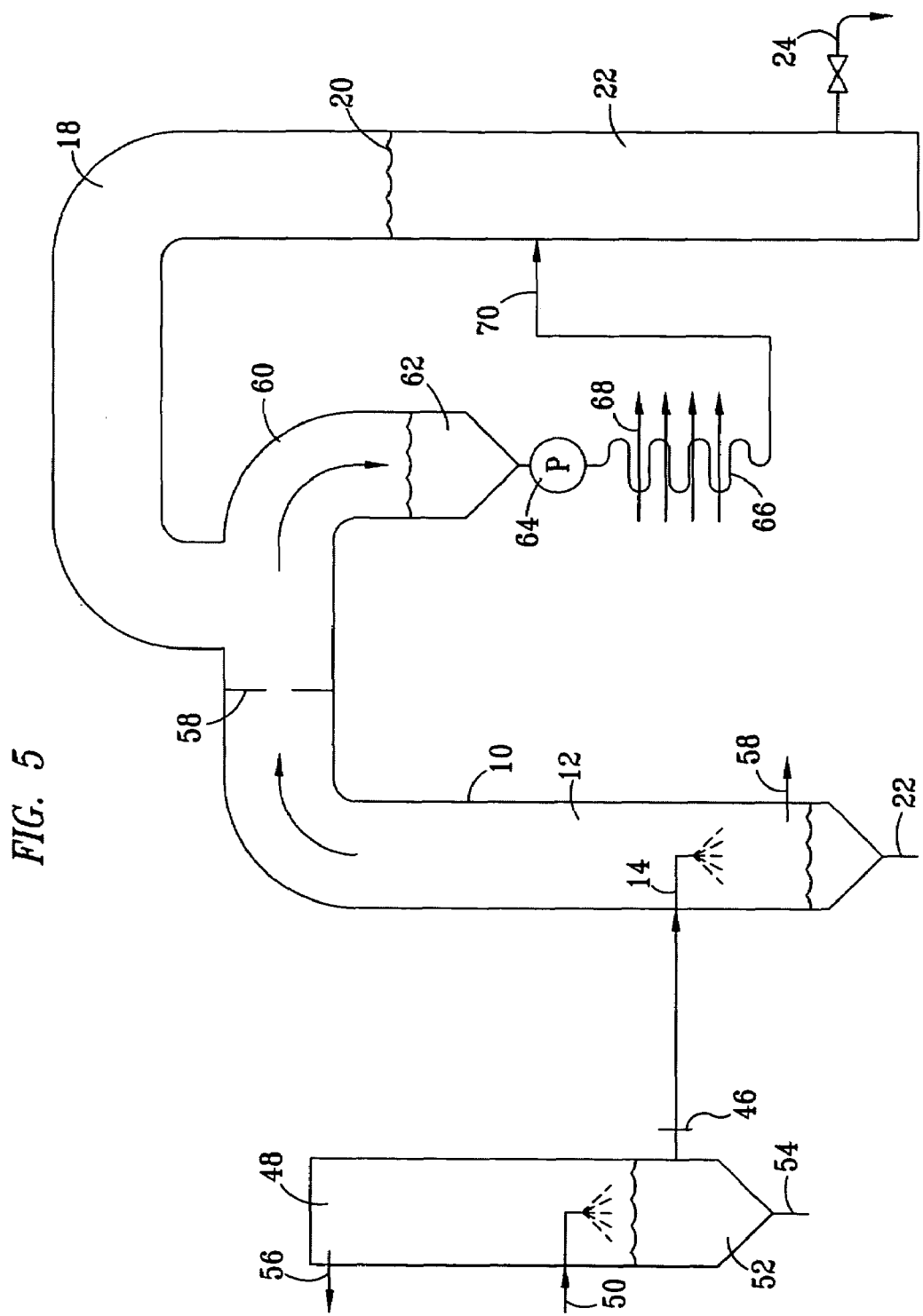
FIG. 5 is a schematic of an exemplary distillation and refrigeration system constructed in accordance with this invention.

Referring now to FIG. 5, the system and method of the present invention my be used to provide refrigeration as well as distillation. In this embodiment, the pressure difference between evaporation region 12 and condensation region 18 is provided by removing distilled water from liquid port 24. A restriction 58 creates a pressure difference sufficient to reduce the temperature in slurry section 60 to form a quantity of pumpable ice slurry 62. The slurry is then pumped by way of pump 64 through heat exchanger 66, to produce refrigerated fluid 68. Heat exchanger 66 can thus be used as, for example, a chilled water air conditioner. Distilled water exiting the heat exchanger 66 is introduced into liquid region 22 though conduit 70, located at an elevation selected to maintain a desired pressure level.

Finally, the apparatus described could be used for purposes wholly different than distilling mixtures. For example, liquid can be introduced through the inlet 14 and subsequently vaporized and condensed as described above. The accomplishment of those phase changes within the apparatus generally result in temperature differences between the evaporation region 12 and condensation region 18. Those temperature differences can be used in a refrigeration cycle as a heat source or sink. Doing so would effectively use liquid as a refrigerant.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A method for evaporating a material and condensing at least part of the material to provide a liquid, comprising the steps of:
   providing an evaporation region, a condensation region, and a liquid region, with the evaporation region, the condensation region and the liquid region being in fluid communication, the evaporation region having an inlet, the liquid region having a liquid port, and a mass of the liquid disposed in the liquid region, such that a surface of the mass of the liquid disposed in the liquid region defines a volume of the evaporation region and the condensation region;
   introducing an inlet feed of the material through the inlet and into the evaporation region;
   wherein the mass of the liquid in the liquid region defines a piston having a liquid level boundary defined by the surface of the mass of the liquid, such that a weight of the mass of the liquid in the liquid region reduces a pressure in the evaporation region in response to removing a mass flow of the liquid from the liquid region;
   removing the mass flow of the liquid from the liquid region through the liquid port to determine the liquid level boundary and reduce the pressure in the evaporation region;
   evaporating at least part of the material in the evaporation region, by means of reducing the pressure in the evaporation region in response to the step of removing the mass flow of the liquid from the liquid region through the liquid port;
   defining a pressure difference between the evaporation region and the condensation region;
   condensing at least part of the material in the condensation region to provide the liquid;
   collecting the liquid which condenses in the condensate region in the liquid region to provide at least part of the mass of the liquid in the liquid region; and
   regulating the inlet feed of the material through the inlet and into the evaporation region and the mass flow of the liquid from the liquid region through the liquid port to define an elevation of the surface of the liquid and the volume in the evaporation region and the condensation region, such that the at least part of the material is evaporated in the evaporation region by the weight of the mass of the liquid in the liquid region reducing the pressure in the evaporation region in response to removing the mass flow of the liquid from the liquid region.

2. The method according to claim 1, wherein the mass flow of the liquid from the liquid region drains, at least in part, by the weight of the mass of the liquid in the liquid region.

3. The method according to claim 1, wherein the step of defining a pressure difference between the evaporation region and the condensation region comprises the steps of:
   providing a blower disposed between the evaporation region and the condensation region; and
   forcing with the blower the at least part of the material which has evaporated in the evaporation region from the evaporation region into the condensation region.

4. The method according to claim 3, wherein the step of providing the blower does not seal between the evaporation region and the condensation region.

5. The method according to claim 1, further comprising the step of absorbing heat in the condensation region and a rejecting the heat into the evaporation region.

6. The method according to claim 1, wherein the step of introducing an inlet feed of the material through the inlet and into the evaporation region comprises the step of spraying the material as a mist into the evaporation region.

7. The method according to claim 1, further comprising the step of absorbing heat in the condensation region and a rejecting the heat into the inlet feed.

8. The method according to claim 1, wherein the step of defining a pressure difference between the evaporation region and the condensation region comprises the step of defining a restriction to flow between the evaporation region and the condensation region, such that flow through the restriction of the at least part of the material which has been vaporized creates a pressure difference sufficient to condense a portion of the material to provide part of the liquid.

9. The method according to claim 8, further comprising the step of removing the portion the liquid condensed in the condensation region, and passing the portion of the liquid through a heat exchanger for absorbing heat.

10. A method for evaporating a material and condensing at least part of the material to provide a liquid, comprising the steps of:
   providing an evaporation region, a condensation region, and a liquid region, with the evaporation region, the condensation region and the liquid region being in fluid communication, the evaporation region having an inlet, the liquid region having a liquid port, and a mass of the liquid disposed in the liquid region, such that a surface of the mass of the liquid disposed in the liquid region defines a volume of the evaporation region and the condensation region;
   introducing an inlet feed of the material through the inlet and into the evaporation region, wherein the material is sprayed as a mist into the evaporation region;
   wherein the mass of the liquid in the liquid region defines a piston having a liquid level boundary defined by the surface of the mass of the liquid, such that a weight of the mass of the liquid in the liquid region reduces a pressure in the evaporation region in response to removing a mass flow of the liquid form the liquid region;
   removing the mass flow of the liquid from the liquid region through the liquid port to determine the liquid level boundary and reduce the pressure in the evaporation region;
   evaporating at least part of the material in the evaporation region by means of reducing the pressure in the evaporation region in response to the step of removing the mass flow of the liquid from the liquid region through the liquid port;
   providing a blower disposed between the evaporation region and the condensation region, and forcing with the blower the at least part of the material which has evaporation in the evaporation region from the evaporation region into the condensation region to define a pressure difference between the evaporation region and the condensation region;

condensing at least part of the material in the condensation region to provide the liquid;

collecting the liquid which condenses in the condensate region in the liquid region to provide at least part of the mass of the liquid in the liquid region; and regulating the inlet feed of the material through the inlet and into the evaporation region and the mass flow of the liquid from the liquid region through the liquid port to define an elevation of the surface of the liquid and the volume in the evaporation region and the condensation region, such that the at least part of the material is evaporated in the evaporation region by the weight of the mass of the liquid in the liquid region reducing the pressure in the evaporation region in response to removing the mass flow of the liquid from the liquid region.

11. The method according to claim 10, wherein the step of providing the blower does not seal between the evaporation region and the condensation region.

12. The method according to claim 10, further comprising the step of transferring heat from the condensation region to the evaporation region to increase vaporization of the inlet feed in the evaporation region.

13. The method according to claim 10, further comprising the step of absorbing heat in the condensation region and a rejecting the heat into the inlet feed.

14. A method for evaporating a material and condensing at least part of the material to provide a liquid, comprising the steps of:

providing an evaporation region, a condensation region, and a liquid region, with the evaporation region, the condensation region and the liquid region being in fluid communication, the evaporation region having an inlet, the liquid region having a liquid port, and a mass of the liquid disposed in the liquid region, such that a surface of the mass of the liquid disposed in the liquid region defines a volume of the evaporation region and the condensation region;

introducing an inlet feed of the material through the inlet and into the evaporation region, wherein the material is sprayed as a mist into the evaporation region;

wherein the mass of the liquid in the liquid region defines a piston having a liquid level boundary defined by the surface of the mass of the liquid, such that a weight of the mass of the liquid in the liquid region reduces a pressure in the evaporation region in response to removing a mass flow of the liquid from the liquid region;

removing the mass flow of the liquid from the liquid region through the liquid port to determine the liquid level boundary and reduce the a pressure in the evaporation region;

evaporating at least part of the material in the evaporation region by means of reducing the pressure in the evaporation region in response to the step of removing the mass flow of the liquid from the liquid region through the liquid port;

evaporating at least part of the material in the evaporation region;

defining a restriction to flow between the evaporation region and the condensation region, such that flow through the restriction of the at least part of the material which has been vaporized creates a pressure difference sufficient to condense a portion of the material into provide the liquid;

condensing at least part of the material in the condensation region to provide the liquid;

collecting the liquid which condenses in the condensate region in the liquid region to provide at least part of the mass of the liquid in the liquid region; and regulating the inlet feed of the material through the inlet and into the evaporation region and the mass flow of the liquid from the liquid region through the liquid port to define an elevation of the surface of the liquid and the volume in the evaporation region and the condensation region, such that the at least part of the material is evaporated in the evaporation region by the weight of the mass of the liquid in the liquid region reducing the pressure in the evaporation region in response to removing the mass flow of the liquid from the liquid region.

15. The method according to claim 14, further comprising the step of transferring heat from the condensation region to the evaporation region to increase vaporization of the inlet feed in the evaporation region.

16. The method according to claim 14, further comprising the step of absorbing heat in the condensation region and a rejecting the heat into the inlet feed.

17. The method according to claim 14, further comprising the step of removing at a portion the liquid condensed in the condensation region, and passing the portion of the liquid through a heat exchanger for absorbing heat.

* * * * *